Aug. 7, 1951        N. C. PRICE        2,563,744
GAS TURBINE POWER PLANT HAVING INTERNAL COOLING MEANS
Original Filed March 6, 1942        3 Sheets-Sheet 2
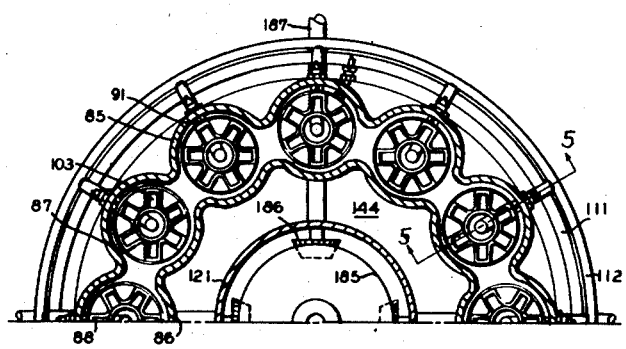
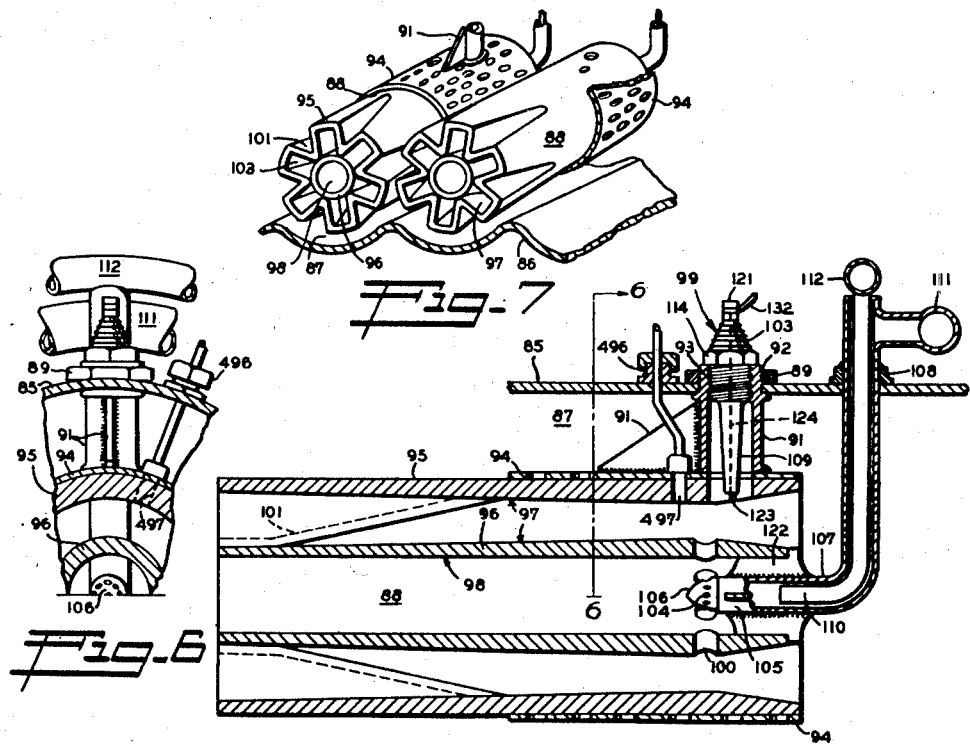
INVENTOR
NATHAN C. PRICE Aug. 7, 1951 N. C. PRICE 2,563,744
GAS TURBINE POWER PLANT HAVING INTERNAL COOLING MEANS
Original Filed March 6, 1942 3 Sheets-Sheet 3
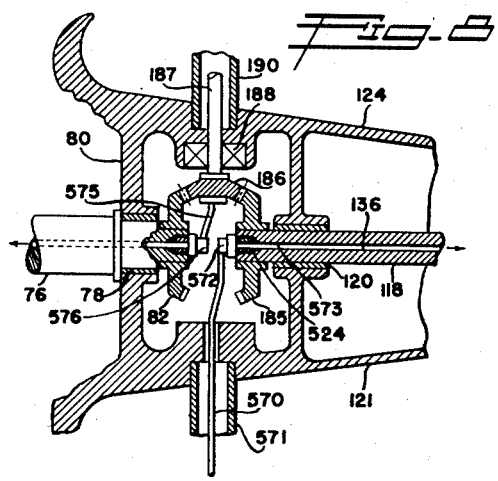
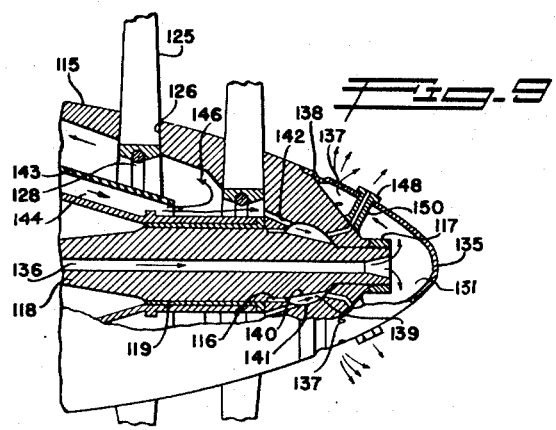
INVENTOR.
NATHAN C. PRICE
BY
*George C. Sullivan*
Agent Patented Aug. 7, 1951

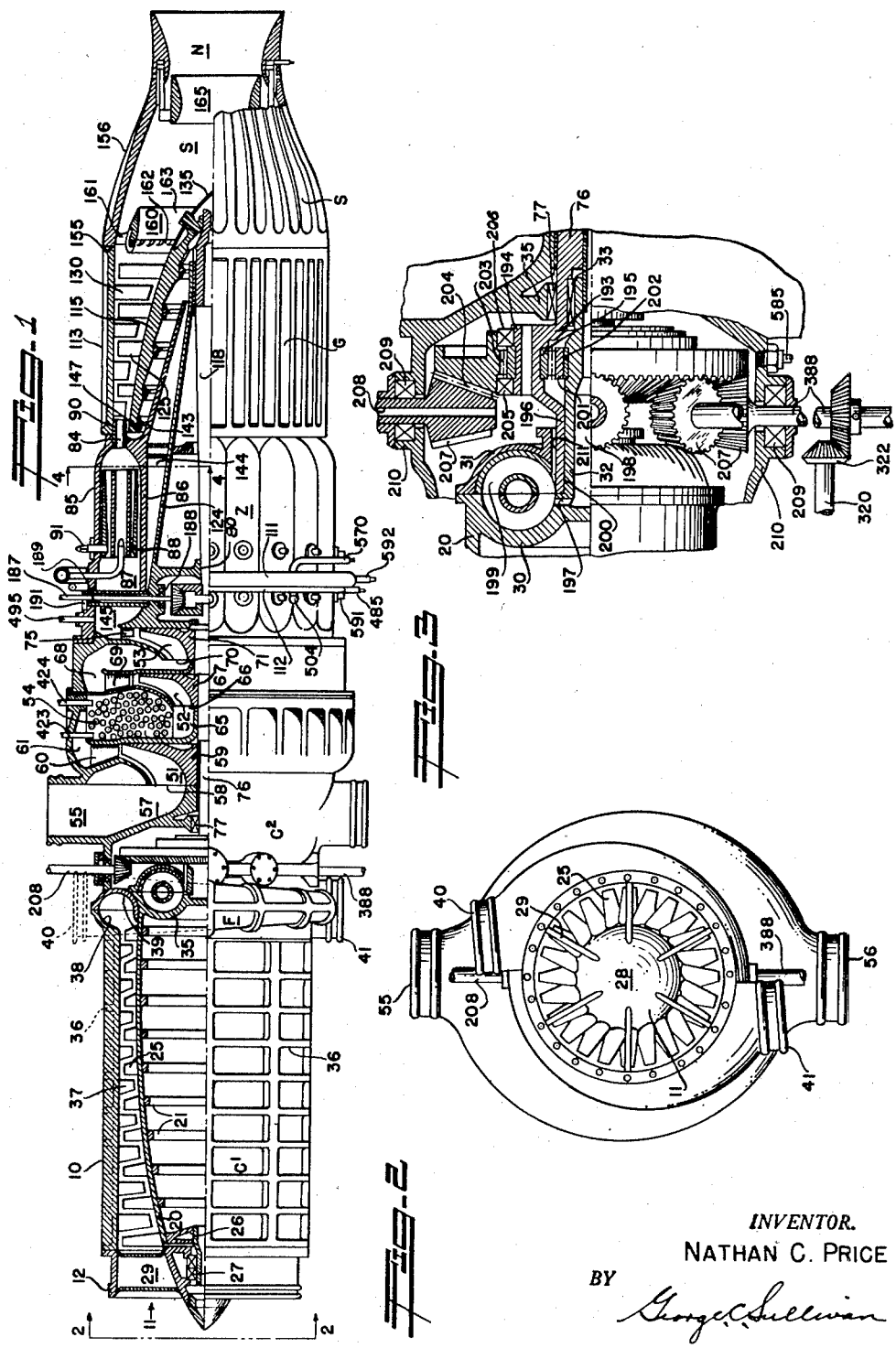

2,563,744

UNITED STATES PATENT OFFICE 2,563,744

GAS TURBINE POWER PLANT HAVING INTERNAL COOLING MEANS

Nathan C. Price, Los Angeles, Calif., assignor to Lockheed Aircraft Corporation, Burbank, Calif.

Original application March 6, 1942, Serial No. 433,599, now Patent No. 2,540,991, dated February 6, 1951. Divided and this application January 19, 1945, Serial No. 573,562

12 Claims. (Cl. 60—41)

This invention relates to prime movers, and relates more particularly to internal combustion reaction type engines or power plants. The invention finds one principal application as a power plant or prime mover for aircraft and other high velocity vehicles, although certain features of the invention are applicable to other classes of mechanisms embodying gas turbines. It is a general object of the invention to provide a power plant of the general class referred to embodying a gas turbine having novel and particularly effective cooling means.

This application is a division of application, Serial Number 433,599, filed March 6, 1942, now Patent No. 2,540,991, patented February 6, 1951, entitled "Aircraft Powerplant."

It is another object of the invention to provide a gas turbine particularly useful as an element of an internal combustion reaction type power plant and in which a portion of the air under pressure from the compressor is utilized to cool the wheel of the gas turbine. A portion of the compressed air is caused to flow axially along the internal surface of the turbine wheel and is then made to flow axially along the external surface of the wheel, thus moving in heat-transfer relation to the two principal surfaces of the wheel. The cooling air forms a boundary layer of relatively low temperature, flowing along the outside surface of the wheel to cool and shield both the wheel and the turbine blade roots from the high temperature gases. The turbine is capable of operating successfully and efficiently in higher temperature ranges than conventional gas turbines because of the improved cooling means of the invention.

It is another object of the invention to provide a turbine construction of the character referred to in which the air for cooling the turbine wheel also serves to effectively cool the bearing means of the wheel.

Another object of the invention is to provide a gas turbine wherein the nose or apex portion of the turbine wheel is cooled both internally and externally by cooling air supplied to the interior of the wheel.

Another object of the invention is to provide a reaction type internal combustion power plant of the character referred to wherein some of the air delivered to the apex of the turbine wheel is discharged therefrom to assist in cooling the same, to maintain a relatively cool airflow through the reduced apex of the wheel and to ultimately mingle with the combustion gases and air in the secondary combustion chamber of the engine and thus increase the efficiency of the power plant as a whole.

It is a further object of the invention to provide a power plant that is an improvement from maintenance and service standpoints compared with conventional power plants.

The features of the invention are herein shown embodied in an aircraft propulsion unit which, briefly, embodies means to efficiently compress air in several stages, maintains a constant combustion of fuel in the air thus compressed to form high temperature, high volume gaseous products of combustion, and which utilizes the expansion and reaction of the gases to drive the compressors and to supply reactive propulsive force to the unit. It is to be understood that the invention may be embodied in other types or classes of power plants.

Other objects and features of the invention will become apparent from the following detailed description of the typical preferred forms illustrated in the accompanying drawings in which:

Figure 1 is an elevation in partial cross-section of the general assembly of the power plant unit of the invention;

Figure 2 is a frontal view of the unit taken at line 2—2 of Figure 1;

Figure 3 is an enlarged detail view in partial cross-section of the axial blower differential accessory drive transmission;

Figure 4 is a partial cross-sectional view taken on the line 4—4 of Figure 1 showing the arrangement of the fuel burners;

Figure 5 is an enlarged detailed longitudinal cross-section taken on line 5—5 of any one of the burner tubes of Figure 4;

Figure 6 is a fragmentary cross-sectional view taken at line 6—6 of Figure 5;

Figure 7 is a perspective view of a pair of the burner tubes of Figure 4;

Figure 8 is an enlarged fragmentary cross-sectional view of the counter-rotation transmission of Figure 1;

Figure 9 is an enlarged fragmentary cross-sectional view of the apex of the gas turbine showing the supplementary fuel jets and other details.

Referring to the drawings in which like reference numerals refer to corresponding parts throughout the several figures, the apparatus of the invention is as follows:

The power plant, operating at high altitude in air of extremely low density, must necessarily handle a great volumetric air flow. It is thereby essential that the inlet of the blower system of the power plant be made unusually large and also have a very high compression efficiency. Therefore, at the leading end of the jet power plant as shown in Figure 1, a cylindrical housing 10 is provided for the multi-stage axial blower $C_1$ which constitutes the first stage air compressor. The housing 10 is provided at the forward end with an annular opening 11 defined by a grooved spigot 12, both of which are of substantially full axial blower diameter and to which a forwardly directed conical ram is connected to extend out of the leading end of the fuselage or the leading edge of the wing according to the type of installation and face forward into the relative airstream with the open end of smallest diameter foremost, whereby intake air may be caught and initially compressed in the ram by impact effected by the high velocity of the air relative to the aircraft under flight prior to its entrance into the beforementioned axial blower.

The rotor shell 20 of the axial blower $C_1$ has a form which may be defined approximately as a truncated, prolate spheroid, and is constructed, preferably, from a relatively thin metal tube spun to the desired shape. A plurality of axially spaced reinforcing rings 21 of suitably varying diameters are attached to the inside surface of the rotor shell 20 by suitable means such as by welding and furnace brazing, one such ring preferably being positioned opposite each row of the plurality of rows of impeller blades 25 and adapted to receive the inwardly extending impeller blade shanks. The rings serve in operation to carry the concentrated centrifugal forces of the blades, and to insure circularity of the rotor while at the same time permitting the rotor shell to be made of relatively thin material, 18 gage chromium steel for example, to reduce weight.

The forward end of the axial blower rotor 20 carries a coaxially positioned, forwardly extending hollow spindle 26 with which it is rotatably supported in suitable bearings 27 which are in turn supported within the streamlined forward bearing housing 28. This forward rotor bearing housing 28 is supported and centrally positioned within the axial blower housing inlet spigot 12 by means of a plurality of interconnecting radially disposed, streamlined struts as best shown at 29 in Figure 2. The struts, in addition to their structural function, serve as air straightening vanes to prevent swirl of air at the inlet of the blower, thereby increasing efficiency of compression. The rear end of the rotor shell 20 is closed by the inner formed half 30 of the housing of a fluid coupling unit F, which in turn, carries a coaxially positioned rearwardly extending spindle 32 as best shown in Figure 3. The fluid coupling structure thus serves as part of the rotor structure, thereby conserving weight and space. Furthermore, in operation, heat developed in the coupling is carried off by indirect heat exchange with the air being discharged from the blower. The said spindle 32 is rotatably supported in suitable needle bearings 33 within the end of shaft 76, which is in turn rotatably supported centrally within the power plant housing by means of a bearing 77 carried in a suitable lateral diaphragm or web 35.

The axial blower housing 10 carries on the inside a plurality of rows of inwardly extending, radially disposed, stationary diffuser vanes 37 arranged to stand intermediate the rows of impeller blades 25 and fitting with small clearances between said blades and said rotor shell. This housing, which may be fabricated or cast of a light-weight metal such as a magnesium alloy, is provided on the outside with a plurality of relatively deep intersecting, laterally and longitudinally disposed ribs 36 for the purpose of imparting sufficient stiffness thereto to maintain impeller-vane clearance to close tolerances.

The inner exhaust end of the axial blower terminates in a split, double scroll outlet housing 38—39 having a pair of outlet spigots 40 and 41 which lead to suitable intercoolers (not shown).

The axial blower rotor is driven through a planetary transmission and a fluid coupling as best shown and hereinafter described in connection with Figure 3.

Located in the intermediate portion of the power plant and immediately to the rear of the axial blower transmission is the second stage air compressor unit $C_2$ which is preferably of a high speed multi-stage radial flow or centrifugal blower type as shown in Figure 1. This centrifugal blower comprises three additional stages of centrifugal compression 51, 52 and 53 in tandem arrangement with a liquid-fed intercooler 54 intermediate its first and second stages. This type of compressor with its integral cooler lends itself to diametrally compact and short coupled construction and is adapted to high efficiency operation upon the dense air fed from the first stage compressor after passing through the wing surface cooler. Furthermore, the series of radial flow impellers in tandem as shown, offers a number of intermediate annular spaces in the main casing, which are ideal from the airflow standpoint for the incorporation, if desired, of additional liquid fed intercoolers which may be constructed and arranged similar to that shown at 54.

A pair of inlet nozzle connections 55 and 56 serve to receive the first stage compressed air and to introduce it through the annular chamber 57 to the inlet 58 of the first centrifugal impeller 59. A plurality of stationary diffuser vanes 60 receive the compressed air from the impeller 59, and annular chamber 61 serves to direct the flow of air therefrom to the inlet of the said liquid fed intercooler 54 which is more fully described hereinafter. The outlet 65 of the intercooler 54 communicates with the inlet 66 of the second centrifugal blower impeller 67 and the annular shaped chamber 68 formed in the body of the unit, in turn serves to direct compressed air leaving impeller 67 after passing through the stationary diffuser vanes 69, to the inlet 70 of the third and final centrifugal compressor impeller 71. Air from the final stage impeller 71 passes through stationary diffuser vanes 75 to the entrance of the combustion chamber Z.

This beforementioned liquid cooled intercooler 54 is preferably constructed of a continuous metal tube wound in the form of a compact multi-layer helix the turns of which are coaxially positioned with respect to the axis of the unit and with the turns spaced relative to one another by means of a plurality of perforated radially positioned fins, the whole being adapted to fit snugly in the annular chamber formed in the blower housing intermediate the first centrifugal stage discharge 61 and the second centrifugal stage inlet 65.

Similarly constructed intercoolers may be placed in the centrifugal blower housing intermediate each of the centrifugal blower stages.

Cooling is effected by circulation of a suitable liquid coolant such as ethylene glycol through the intercooler coils and through a suitable heat exchanger external to the blower.

The said three centrifugal blower impellers 59, 67 and 71 are fixed to a common shaft 76 which is rotatably journaled at its forward end in bearing 77 as best shown in Figure 3, and at the rear end in bearing 78. Bearings 77 and 78 are supported coaxially within the body of the centrifugal blower portion of the power unit by suitable diaphragms or webs 35 and 80, respectively. The forward extension of the centrifugal blower shaft 76 couples into the axial blower and accessory transmission in a manner more fully described hereinafter. The rear end of the shaft 76 carries a bevel gear 82 which constitutes a portion of the counter-rotation transmission through which it is driven by the gas turbine G, also as more fully described hereinafter.

The beforementioned combustion chamber Z into which the final stage compressor discharges, is an approximately annular space defined on the outside by the housing 85 and on the inside by a shroud 86, both preferably fabricated from a heat resistant alloy such as nickel-chromium-iron. The said outside housing 85 and inner shroud 86 are formed with adjacent and oppositely facing ogee curves which together form in effect, a series of sidewardly interconnected, parallel cylindrical pockets or barrels 87 having their axes equi-distant from and parallel to the axis of the power unit and adapted to house the plurality of cylindrical burner tubes 88 as best shown in Figures 4, 5 and 7. The substantially annular combustion chamber Z, comprising said pockets or barrels, converges at the rear end to an annular nozzle ring 90 of reduced cross-sectional area and containing in the portion of reduced area, a plurality of circumferentially spaced vanes as shown at 84 in Figure 1. The said combustion chamber nozzle ring 90 serves to hold a back pressure upon the combustion chamber and to efficiently discharge hot gases at high velocity from the combustion chamber into the expansion zone of the gas turbine G.

The beforementioned burner tubes 88 are each coaxially positioned and rigidly supported within each of the combustion chamber pockets 87 by means of a streamlined tubular strut as shown at 91 which passes radially out through the combustion chamber shell 85 and is retained in gas-tight connection therewith by means of external nuts 89 threaded at 92 to the outwardly projecting portion 93 of the said struts. The inner end of the said strut makes welded connection with a perforated cylindrical sleeve 94 in which the burner tube 88 is firmly gripped. The perforated sleeve 94 and strut 91 are preferably constructed of a heat resistant metal alloy such as nickel-chromium-iron.

The burner tubes which are preferably constructed of a refractory material such as carborundum, are as previously stated, cylindrical in general form, but are constructed as best shown in Figures 5 and 7 of two concentric tubular portions 95 and 96 which together form an intermediate annular passageway 97 having an approximate Venturi shape as viewed in longitudinal cross-section, and an inner straight cylindrical passage 98. The Carborundum can withstand a temperature of 3500° Fahrenheit. In case a thermal fracture should develop in the carborundum, the air-cooled perforated sleeve 94 serves to hold the fractured parts together.

The outer tubular wall 95 of the burner is formed with a plurality of external V-shaped flutes of variable depth as shown at 101 which extend upward and vanish at a point about half the length of the burner from the rear or outlet end 102. The inner surfaces of the V-shaped flutes make contact at their inner vertices with the rear portion of the beforementioned inner tubular portion 96 of the burner and form in conjunction therewith, a plurality of circumferentially spaced outlet openings as best shown at 103 in Figure 7. Concentric support for the rear end of the said inner tube 96 is also thus provided.

A plurality of radially directed holes, as shown at 100, pass through the inner tubular portion of the burner at the throat portion of the Venturi section.

Fuel spray nozzles extend concentrically for a short distance into the forward ends of each of the before described burner tubes as shown at 105 and each nozzle carries at the inner end, a spray head 106 provided with peripherally spaced perforations 104 adjacent and coaxially directed with respect to the beforementioned holes 100 leading into the annular combustion passages. The said spray nozzles communicate with and are supported by air injection tubes 107 which extend laterally through suitable flanged inlet connections 108 provided in the rear portion of the combustion chamber housing 85. These air injection tubes make connection through suitable manifolding 111 to a source of compressed air; and centrally positioned within the air injection tubes 107 and extending to a point close to the nozzle head is a fuel injection tube 110 which makes external connection through a manifold 112 to suitable fuel supply pumps and regulators. The fuel spray nozzles are each provided with a spider comprising a number of relatively thin radially positioned webs as shown at 122 adapted to fit snugly into the inside of the forward portion of the inner burner tube 96. The said spider thus serves as a positioning and centering support for the forward end of the inner burner tube.

Making threaded connection into each of the outer end portions 93 of the burner tube struts 91 which extend outside of the combustion chamber housing 85 is a glow plug 99 which serves as the igniting means for the combustible fuel-air mixture which is formed in and flows through the burner tubes. The glow plug is constructed with a threaded metal bushing portion 114 surrounding an elongated central refractory insulating body portion having an inwardly projecting tapered shank 109 extending through the strut 91 to the throat of the burner tube, and an outwardly extending ribbed insulating portion 103 carrying a terminal 121. A small filament or coil 123 of high melting point wire such as platinum, supported upon the inner end of the body portion of the plug is electrically connected through a central conductor bar 124, terminal 121, and a conductor wire 132 to a suitable source of low tension electric current. The refractory body portion of the glow plug may be composed of Carborundum, mica or the like insulating materials.

The gas turbine G, embodying the principal features of the present invention, is arranged within a cylindrical housing 113. The turbine comprises a tapered rotor 115 having the approximate shape of a portion of an extremely prolate spheroid and being coaxially positioned within the power plant with the end of minimum diameter facing rearwardly in the direction of flow of the propellant gases. The said rotor 115 is splined at 116 and bolted at 117 to the rear end of a hollow, tapered shaft 118, which is in turn rotatably supported concentrically within the power unit upon a pair of shaft bearings comprising a forward bearing 120 and a rear bearing 119. The rear turbine rotor shaft bearing 119 is supported by means of a hollow truncated cone-shaped cantilever member 124, which is attached at its forward end of largest diameter to the transverse bulkhead web 80 which separates the final stage compressor housing from the combustion zone and gas turbine housing.

The gas turbine rotor is provided with a plurality of rows of impeller blades or buckets as shown at 125 in Figures 1 and 9, which may be constructed from heat resistant, high strength alloy such as nickel-chromium-iron. The said turbine rotor blades 125 are adapted to be inserted from the inside and to make a light press fit through suitable shaped openings 126 broached in the rotor shell 115, and during operation to be held firmly in place by centrifugal force. Internal, circular snap rings 128 adapted to lie in suitable grooves 129 formed along the inside ends of the blade root shoulders serve to hold the blade shoulders firmly in seated position in the rotor at all times.

The plurality of gas turbine stator blades as shown at 130 and which extend radially inward intermediate the before described rows of impeller blades is attached by welding at their outer root ends to the interior surface of the cylindrically shaped turbine housing 113.

At the apex of the turbine rotor, a conical cap member 135 encloses a space 131 into which fuel may be injected under pressure by way of a bore 136 within the hollow turbine shaft 118. The said conical cap is provided with a plurality of divergingly directed orifices 137 equi-spaced in its periphery and adjacent its end of greatest diameter where it meets and makes oil tight connection at 138 with the rotor body 115. Injection of supplementary fuel at this point greatly increases the thrust of the power plant by efficiently distributing added fuel to burn the excess air leaving the gas turbine wheel and about to enter the main propulsive nozzle.

The thrust output of the power plant is enhanced by operation with relatively high temperature gases entering the gas turbine. The limitation of temperature has a structural basis. The gas turbine can operate in a higher temperature range than that of conventional turbines because of the structural provisions and cooling arrangements provided.

A truncated cone shaped baffle 143 is provided as a rearward extension of the inner shroud 86 of the beforementioned combustion chamber Z. The tapering annular-like space 144 thus formed between the conical shaped turbine bearing support 124 and the said inner combustion chamber shroud 86 and the baffle 143 serves to conduct cooling air under suitable pressure from the annular forward end of the combustion chamber at 145 to the inner apex of the turbine rotor adjacent the bearing 119 and thence counter-current to the propellant gases in the turbine as shown by arrow 146 back along the inner surface of the turbine rotor 115 and in contact with the inner ends of the rotor blade roots 127 to the openings in an annular cooling air nozzle ring 147 which is immediately inside of and concentric with the gas turbine nozzle ring 90. As illustrated in Figure 1, the baffle 143 extends rearwardly and axially inward at a steeper or greater angle than the bearing support 124 to be in rearwardly converging relation to the bearing support and to be in rearwardly diverging relation to the surrounding wall or shell of the rotor 115. Accordingly the space 144 tapers rearwardly, the fluid capacity of the rear end portion of the space 144 being considerably less than the fluid capacity of the forward portion of the space and the annular space of passage between the baffle 143 and the wall of the rotor tapers forwardly being of larger fluid capacity at its rear portion than at its forward end. The annular gradually constricted passage or space 144 acts as a nozzle to discharge the cooling air at a substantial velocity for expansion in the apex portion of the turbine rotor 115 adjacent the bearing 119. A plurality of drilled ducts as shown at 142 in Figure 9 are provided for conducting a portion of the cooling air from the inside of the rotor to the annular cooling cavity 139 formed between the taper 140 adjacent the end of the turbine rotor shaft and an adjacent relieved concavity 141 in the turbine rotor. A plurality of exhaust nozzles 148 is provided for exhausting cooling air from the cavity 139 into the secondary combustion chamber S. The nozzles are in the form of drilled cap screws which pass through suitable holes in the cap 135 and make threaded connection into nipples 150 which are welded at 151 to the turbine rotor body. The said nozzles thus also serve to retain the cap 135 in oil tight position on the apex end of the turbine.

Immediately to the rear of the gas turbine and attached at 155 to the gas turbine housing, is the secondary combustion chamber S and nozzle section N which comprises an approximately Venturi shaped housing 156. The secondary combustion chamber is shaped to utilize the kinetic energy of the residual gas velocity from the turbine wheel so that it is additive to the kinetic energy of the propulsive jet.

An annular baffle 160 having a streamlined section similar to that of an airfoil is concentrically supported, adjacent the gas turbine exhaust within the entrance to the secondary combustion chambers and diametrically opposite the secondary fuel orifices 137 in the rotor cap 135, by means of a plurality of radially directed interconnecting streamlined struts 161. This baffle is preferably constructed with a leading edge portion 162 of heat resistant metal such as a nickel-chromium-iron alloy, and a body and trailing edge portion 163 of Carborundum or like refractory material.

The nozzle portion N is provided with an inner longitudinally movable annular throat member 165 the construction and operation of which are described and claimed in my copending application, Serial No. 581,994 filed March 10, 1945, now Patent No. 2,487,588.

Power is adapted to be transmitted from the gas turbine to the radial and axial blowers and to the various auxiliary drive shafts throughout the unit through suitable gear transmissions which comprise the following apparatus:

Referring primarily to Figures 1, 3 and 8, the forward end of the hollow gas turbine shaft 118 carries fixed at a point just forward of the bearing 120, a bevel gear 185 which meshes with a plurality of bevel pinions as shown at 186, each splined to the inner end of a radially positioned auxiliary drive shaft as shown at 187 in Figures 1 and 8. The said auxiliary pinion drive shafts are each rotatably supported upon a pair of suitable bearings as shown at 188 and 189 and a number of such shafts as required are arranged to pass radially through the forward portion of the combustion chamber through tubular housings 190 and out of the combustion chamber housing through stuffing boxes as indicated at 191.

Fixed to the rear end of the radial blower shaft 76 as seen in Figure 8 and adjacent the bearing 78 is a bevel gear 82 which also meshes with the beforementioned bevel pinions 186. Shafts 76 and 118 are thus adapted for counter-rotation with respect to one another, through the action of the transmission comprising bevel gears 185 and 82 and bevel pinions 186.

A pipe 570 for supplementary fuel, enters the combustion zone housing and extends radially through a tubular housing 571, not occupied by an auxiliary drive shaft, to a centrally positioned angle fitting 572 adjacent the forward end of the gas turbine shaft 118. A tube 573 extends from the said angle fitting 572 through a packing gland 524 and into the central bore 136 of the said shaft. An oil line 575 similarly makes connection at 576 with the central bore of the centrifugal compressor shaft 76 by way of which lubricating oil may be introduced under pressure through the rear, axial blower shaft 32 and into the fluid coupling by way of opening 197 in the housing as best shown in Figure 3.

Referring now primarily to Figure 3 which shows, in enlarged detail, the type of axial blower transmission employed in the unit of Figure 1, the centrifugal compressor shaft 76, as before stated, is rotatably journaled at the fore and aft ends in bearings 77 and 78 respectively. The shaft 76 makes connection just forward of the bearing 77, through a conical flange 193 with a planetary drive spider 94 which carries therein six parallel shafts upon which are rotatably mounted six planetary pinions as shown at 195. A further extension 196 of the shaft 76, forward of the planetary drive spider 194, enters the fluid coupling housing 30—31 and carries fixed on the end thereof the fluid coupling impeller 199. The just mentioned forward shaft extension 196 makes a rotatable fit over the rear axial blower shaft 32 to 200. A laterally directed drilled hole 197 is provided to interconnect the fluid coupling housing with the bore 198 of the rear axial blower shaft 32 through which oil may be introduced under suitable pressure into the said coupling. Annular clearance 211 between the outside of shaft 32 and the coupling housing entrance is provided for continuous escape of oil from the coupling unit.

The beforementioned planetary pinions 195 mesh with an inner sun-gear 201 which is keyed to the axial blower spindle 32 at 202 and they also mesh with an outer planetary ring gear 203 formed on the inside diameter of the bevel accessory drive gear 204. The ring-like unit comprising the bevel gear 204 and the planetary ring gear 203 is rotatably supported upon the outside shoulders of the planetary spider 194 by means of a pair of suitable ball bearings 205 and 206. The bevel gear 204 meshes with a plurality of bevel pinions as shown at 207 which is carried on radially positioned outwardly extending accessory drive shafts as shown at 208 which are rotatably supported in suitable bearings 209 carried in the transmission housing 210. An oil scavenging line for withdrawal of oil discharge from the fluid coupling enters the bottom of the transmission housing at the lowest point as shown at 585.

In operation it will be assumed that the power plant has been started and a relatively low cruising speed of approximately 600 feet per second relative to the air at zero pressure altitude has been attained by the power unit and the associated aircraft, the operation of the internal components of the power unit are as follows:

Air entering the ram R at high velocity and at a pressure of 14.7 pounds per square inch absolute, is compressed by impact to a pressure of approximately 18 pounds per square inch absolute, at the inlet 11 to the axial blower $C_1$. The air is discharged from the axial blower at a pressure of approximately 26 pounds per square inch absolute into the double scroll outlet housing 38—39 and thence through the outlet spigots 40 and 41 and ducts 42 and 43 to the intercoolers (not shown).

Cooled first stage compressed air from the said intercoolers returns to the spigots 55 and 56 and thence to the entrance 58 of the first impeller of the multi-stage centrifugal compressor $C_2$. Compressed air from the first centrifugal rotor 59 passes through a liquid cooled surface intercooler 54 where it is again cooled and thence through centrifugal impellers 67 and 71 and finally through the diffuser vanes 75 into the entrance 145 of the combustion chamber Z at a final pressure of approximately 240 pounds per square inch.

Here the compressed air is divided, a major portion flowing on through the internal passages of the burner tubes and through the substantially annular clearance spaces between the burner tubes and the combustion chamber housing 85 and inner shroud 86 and another portion of the air entering at 145 flows, for cooling purposes, down through the tapering, substantially annular passageway 144 formed between the conical shaped turbine bearing support member 124 and said inner shroud 86 of the combustion chamber and its baffle extension 143, to the inner apex of the gas turbine rotor adjacent the rotor bearing 119. From here a portion of the cooling air turns, as indicated by arrow 146 best shown in Figure 9, and flows back along the inner surface of the turbine rotor shell 115 and in heat exchange contact with the inner ends of the rotor blade roots as shown at 127, and finally is exhausted to the gas turbine expansion zone inlet through the annular cooling air nozzle ring 147, which is positioned immediately inside of and concentric with the annular combustion gas nozzle ring 90, where it joins in laminar flow, the combustion gases issuing from the combustion chamber Z. The air thus flows from the annular inlet at the surface of the turbine rotor and forms a concurrently flowing layer of relatively cool air intermediate the hot propellant combustion gases and the outer surface of said rotor. This relatively cool boundary layer of air thus flowing along the outside surface of the turbine wheel serves to cool and shield it and the blade roots from the high temperature gases.

Another portion of the air conducted to the inner apex of the gas turbine rotor adjacent the bearing 119 passes through the ducts 142 into the cooling cavity 139 and thence out through the discharge orifices 150 to the secondary combustion zone. Heat is thus carried away from the bearing 119 and from the massive apex portion of the turbine rotor.

That portion of the compressed air which passes through the clearance spaces between the burner tubes and the combustion chamber walls serves to cool both the chamber housing and the burner tube and to dilute the products of combustion, leaving the burner tubes sufficiently cool to limit the combustion chamber gases to a safe value. Another portion of the air passes through the central tubular passages 98 of the burner tubes and serves to cool the inner elements thereof including the fuel spray tip and nozzle 105 and 106. That portion of the compressed air which passes through the Venturi-shaped passages 97 of the burner tubes meets and mixes with the atomized spray of fuel issuing radially through the holes 100 in the inner tubular portion of the burner from perforations in the spray nozzle head 108. The resultant air-fuel mixture once ignited by the hot filament 123 of the glow plug 99 continues to burn throughout the length of the burner tube passages. The said burner tubes, as hereinbefore stated, are preferably constructed of Carborundum which, when heated, has catalytic properties which contribute beneficially to the rapidity and efficiency of the combustion process.

The heated gaseous combustion products and excess air of greatly expanded volume are continuously released from the combustion chamber at high velocity through the restricted opening formed through the annular nozzle ring 90 into the initial stages of the gas turbine expansion zone. The metal of the nozzle ring 90 is cooled to some exent by the expansion of cooling air in the adjoining cooling air nozzle ring 147, preventing thermal erosion.

The expanded and partially cooled gases from which a portion of the power has been extracted in passing through the gas turbine in the form of rotative torque applied to the turbine shaft 118, is discharged axially from the gas turbine expansion stages into the secondary combustion chamber S and thence out through the nozzle N in the form of a rearwardly directed and efficiently expanded high velocity reactive gaseous jet. The propulsive force exerted by the reaction of the gases leaving the said nozzle N is the thrust which is utilized in whole or in part to propel the unit and the aircraft with which it is associated.

When additional thrust is required and at certain times when maximum efficiency of operation of the unit is to be attained, more or less supplementary fuel injection into the secondary combustion zone S through the orifices 137, is employed. Such supplementary fuel enters the secondary combustion chamber in the form of a fine spray of a mixture of vaporized and atomized fuel where it meets and mixes in most part with the high velocity gases issuing from the gas turbine, and with the heavier particles of the unvaporized fuel spray reaching and impinging upon the inner surface of the annular shaped refractory baffle 160. Secondary combustion is thus promoted with the excess air associated with the said gas turbine exhaust gases. The said annular baffle 160 prevents the secondary combustion flame from directly contacting the inner lining of the combustion chamber and aids in the surface combustion of the liquid fuel particles which reach it.

The transmission of power from the gas turbine to the compressor and auxiliary equipment is as follows:

The high speed rotation of the rotor of the gas turbine G is transmitted through the turbine shaft 118 and through the before described counter-rotation transmission to the shaft 76 of the second stage centrifugal compressor C₂.

The chief function of the rotation reversing transmission is substantially to balance or cancel out the gyroscopic effect of the various high speed rotating bodies within the unit, and its incidental value resides in the convenient facilities it provides for auxiliary drives of the type just mentioned. The balancing out of the gyroscopic forces is of great importance in a maneuvering type of airplane, particularly in a combat airplane, to avoid precession effects while making quick turns or "pull outs" from a dive.

The balance of the power from the turbine, not absorbed in driving the auxiliaries and second stage compressor is transmitted on through the shaft 76 to the axial blower transmission hereinbefore described primarily in connection with Figure 3. The operation of the said axial blower transmission is as follows:

The rotation of the shaft 76 is imparted through flange 193 to the planetary drive spider 194 and the plurality of planetary pinions 195 carried therein and also to the fluid coupling impeller 199 carried within the housing 30—31 upon the concentric shaft extension 196. As before described, the said planetary pinions 195 mesh on the inside with the sun gear 201 fixed to the axial blower shaft 32 and on the outside with the ring gear 203 fixed on the inside diameter of the accessory drive bevel gear 204. The axial blower shaft extension 196 and the bevel gear 204 are thus differentially driven by the beforementioned planetary pinions. The bevel gear 204 meshes with the plurality of bevel pinions as shown at 207, which drive a number of accessory shafts extending radially from the differential transmission as shown at 208 and 388. The power transmitted through shaft 76 is thus divided by the planetary pinions 195, between the various accessory drive shafts and the axial blower shaft 32 or, in other words, the power transmitted through to the axial blower is the difference between the imput of shaft 76 to the transmission and that absorbed by the accessory drives. The relative speeds of rotation of said auxiliary shafts and blower shaft are likewise differential.

Assuming that the fluid coupling is substantially empty of oil, the relative or differential speeds of the accessory drive shafts and the axial blower shaft will be entirely a function of the corresponding torque of the combined accessory drives relative to the torque of the axial blower. For example, if the torque on the accessory drive is light, resulting in its high speed, then the speed of the axial blower will be lower, but, if on the other hand, the load on the accessory drive is increased, resulting in lower accessory drive shaft speed, then the axial blower speed will be differentially higher. The methods by which the loading on the accessory differential drive is varied will be described hereinafter in connection with the boundary layer control apparatus.

Now if the fluid coupling housing is progressively filled with fluid by the introduction of oil under pressure by way of the central bore in shaft 32, and finally through the lateral inlet hole 197 in the coupling housing 30, the degree of coupling between the two shafts 32 and 196 may be progressively increased. In so doing the speed of the axial blower becomes progressively more directly dependent upon the transmission input speed of shaft 76—196 carrying the coupling impeller 199 and less dependent upon the differential effect of the loading of the accessory shafts, and the speeds of the accessory drives will at the same time be thereby increased with respect to said axial blower speed. In this manner a wide range of power distribution and relative speeds between the accessory drives and axial blower may be attained without the power losses customarily associated with variable speed drives which usually dissipate power wastefully.

From the foregoing it will be evident that the invention may have a number of equivalent embodiments and several forms and arrangements of associated apparatus. It is to be understood that the foregoing is not to be limiting but may include any and all forms of method and apparatus which are included within the scope of the claims.

I claim:

1. A gas turbine comprising a substantially cylindrical housing carrying a plurality of stator blades, a rotatable rotor in the housing including a hollow tapered shell arranged with its apex facing in the direction of flow of the propellent gases in the expansion zone formed between said housing and shell, and a plurality of impeller blades carried by said shell and extending into the expansion zone intermediate said stator blades, a rotor supporting member extending forwardly into the hollow shell from its rear end to adjacent the apex thereof, a stationary tubular baffle in the rotor shell spaced between the inner surface of said shell and said supporting member to leave an inner annular passage for conducting cooling air forwardly in the shell to adjacent the apex of its tapered shell and to leave an outer annular passage for conducting said cooling air rearwardly from the apex portion of the shell to flow in an annular stream in heat exchange relationship with the inside surface of the rotor shell, and means for introducing said cooling air into the rear end of said inner passage for flow through the passages.

2. A gas turbine comprising a substantially cylindrical housing carrying a plurality of stator blades, a rotatable rotor in the housing including a hollow tapered shell arranged with its apex facing in the direction of flow of the propellent gases in the expansion zone formed between said housing and shell, and a plurality of impeller blades carried by said shell and extending into the expansion zone intermediate said stator blades, a rotor supporting member extending forwardly into the hollow shell from its rear end to adjacent the apex thereof, a tubular baffle in the rotor shell spaced between the inner surface of said shell and said supporting member to leave an inner annular passage for conducting cooling air forwardly in the shell to adjacent the apex of its tapered shell and to leave an outer annular passage for conducting said cooling air rearwardly from the apex portion of the shell to flow in an annular stream in heat exchange relationship with the inside surface of the rotor shell, a compressor driven by said rotor, means for directing compressed air from the compressor to the rearward end of said inner passage for flow through said passages, and nozzle means for discharging the cooling air from the rear end of said outer passage into the forward end of said expansion zone at the external surface of said shell to form a relatively cool layer of flowing air on the outer surface of said shell.

3. A gas turbine comprising a substantially cylindrical housing carrying a plurality of diffuser blades, an impeller rotatably mounted in said housing and having a hollow rotor shell of the approximate shape of one-half of a prolate spheroid with its apex facing in the direction of flow of the propellent gases in the expansion zone formed between said housing and said rotor shell, a plurality of impeller blades carried by said rotor shell and extending into the said expansion zone intermediate the said diffuser blades, means to conduct cooling air to a point inside the rotor shell adjacent the apex thereof, a cooling duct leading through said rotor shell adjacent the apex thereof whereby a portion of said cooling air supplied to said point inside the rotor shell may be passed in heat exchange through said shell and means to discharge said cooling air from the apex of said rotor shell to maintain cooling air flow through the apex portion of the rotor shell and to co-mingle with the air thus discharged with exhaust gases leaving the expansion zone of said turbine.

4. A gas turbine comprising a housing carrying a plurality of diffuser blades, a rotatable rotor in said housing including a hollow tapered rotor shell having its apex facing in the direction of flow of the propellent gases in the expansion zone formed between said housing and said rotor shell, and a plurality of impeller blades on the shell extending into the expansion zone intermediate said diffuser blades, a compressor driven by the rotor, a combustion zone for producing propellent gases, means for conducting compressed air from the compressor to the combustion zone, a rotor supporting member extending forwardly into the hollow shell from the rear end thereof to adjacent the apex thereof, a tubular imperforate baffle in the rotor shell spaced between said supporting member and the inner surface of the rotor shell to leave an inner annular passage for conducting cooling air forwardly in the shell to adjacent the apex thereof and to leave an outer annular passage for conducting the cooling air rearwardly from the apex portion of the shell to flow in heat exchange relationship with the inside surface of the rotor shell, said supporting member and baffle being stationary, means for conducting compressed air from the compressor to the rear end of said inner passage for flow through said passages, and means for discharging the cooling air from the rear end of said outer passage into the forward portion of said expansion zone.

5. A gas turbine comprising a housing, a hollow turbine wheel in the housing having an open rear end and a forward end wall constituting the apex of the wheel, the wheel being spaced from the interior of the housing to leave an expansion zone, blading on the housing and wheel within the expansion zone, a stationary supporting member extending forwardly into the hollow wheel, bearing means for the apex portion of the wheel carried by said member, means for introducing cooling air under pressure into the rear end of the hollow wheel, and stationary baffle means in the rotor wheel for directing the cooling air to the bearing means and inner surface of the wheel to cool the same.

6. A gas turbine comprising a housing, a hollow turbine wheel in the housing having an open rear end and a forward end wall constituting the apex of the wheel, the wheel being spaced from the interior of the housing to leave an expansion zone, blading on the housing and wheel within the expansion zone, a pair of spaced stationary and substantially concentric tubular members extending forwardly into the hollow wheel, the space between the members forming a passage for conducting cooling air forwardly to the apex portion of the wheel, one member spaced from the inner surface of the wheel to leave an outer passage for conducting said cooling air rearwardly in heat transfer relation to the inner surface of the wheel, and means for supplying cooling air under pressure to the rear end of the first named passage.

7. A gas turbine comprising a housing, a hollow turbine wheel arranged in the housing in spaced relation to the internal wall thereof to leave an expansion zone in the housing, blading on the wheel and housing within said zone, fuel combustion means at one end of said zone, means for supplying a stream of combustion air under pressure to the combustion means, and means for diverting a portion of the air stream to flow in heat-transfer relation to the peripheral wall of said wheel and then into said zone, the last named means including a stationary tubular baffle structure in the wheel spaced from the interior thereof to leave an annular passage for the flow of cooling air.

8. A gas turbine comprising a housing, a combustion zone in the housing, compressor means for passing air under pressure through the combustion zone, a hollow tapered turbine wheel arranged in the housing in spaced relation to the wall thereof leaving an expansion chamber which receives the gases of combustion from said combustion zone, the tapered wheel being arranged with its largest end facing toward the combustion zone, blading on said wheel and housing in said combustion zone, a stationary tubular baffle structure in the wheel defining a passage for conducting air under pressure from said compressor to the small end portion of the wheel and spaced from the internal surface of the wheel to have an annular passage for conducting said air axially through the wheel from said small end portion to said largest end in heat-transfer relation to the peripheral wall of the wheel, and bearing means in said small end portion of the wheel for rotatably supporting the same, cooled by said air.

9. A gas turbine comprising a housing, a combustion zone in the housing, compressor means for passing air under pressure through the combustion zone, a hollow tapered turbine wheel arranged in the housing in spaced relation to the wall thereof leaving an expansion chamber which receives the gases of combustion from said combustion zone, the tapered wheel being arranged with its largest end facing toward the combustion zone, blading on said wheel and housing in said combustion zone, means for conducting air under pressure from said compressor to the small end portion of the wheel, means for conducting said air axially through the wheel from said small end portion to said largest end in heat-transfer relation to the peripheral wall of the wheel, and nozzle means in said small end portion of the wheel for discharging a part of said air therefrom to maintain cooling air flow through said small end portion to cool the same.

10. A gas turbine comprising a housing, a combustion zone in the housing, compressor means for passing air under pressure through the combustion zone, a hollow tapered turbine wheel arranged in the housing in spaced relation to the wall thereof leaving an expansion chamber which receives the gases of combustion from said combustion zone, the tapered wheel being arranged with its largest end facing toward the combustion zone, blading on said wheel and housing in said combustion zone, means for conducting air under pressure from said compressor to the small end portion of the wheel, a tubular support member entering said large end of the wheel, bearing means for the wheel carried by the support member, and a tubular baffle within the wheel spaced around said member to leave a passage for conducting air from the compressor to the small end portion of the wheel, said baffle being spaced from the internal surface of the wheel to define a passage for conducting said air from the small end portion of the wheel to the large end portion of the wheel so as to discharge therefrom and flow axially along the external surface of the wheel.

11. A gas turbine comprising a housing, a combustion zone in the housing, a turbine wheel rotatably supported in the housing in spaced relation to the wall thereof to have an expansion zone, blading on the housing in said expansion zone, blading on the wheel extending into said expansion zone, compressor means for delivering compressed air to flow axially through said combustion zone, the combustion zone serving to pass gases of combustion to said expansion zone for axial flow therethrough, means for intercepting a stream of air under pressure from said compressor means and directing it into said wheel, baffle means in the wheel for directing said stream along the internal peripheral surface of the wheel in counter flow relation to said gases and to discharge from an end of the wheel for flow along the external peripheral surface of the wheel in the same direction as said gases, a cap for the other end of the wheel, and nozzles securing the cap to the wheel and discharging a portion of said air stream to aid in cooling the wheel.

12. In a gas turbine, a casing, a turbine wheel in the casing, stationary bearing means in the wheel journaling the same for rotation, and means for cooling the wheel comprising means for conducting cooling air into the wheel, and a stationary annular nozzle within the wheel in adjacent coaxial relation to said bearing means for discharging the cooling air into the wheel to cause expansion of the air adjacent the bearing means to cool the same.

NATHAN C. PRICE.

REFERENCES CITED

The following references are of record in the file of this patent:

UNITED STATES PATENTS

| Number | Name | Date |
|---|---|---|
| 1,421,087 | Johnson | June 27, 1922 |
| 2,243,467 | Jendrassik | May 27, 1941 |
| 2,269,181 | Clarke | Jan. 6, 1942 |

FOREIGN PATENTS

| Number | Country | Date |
|---|---|---|
| 143,015 | Great Britain | May 20, 1920 |
| 781,057 | France | May 8, 1935 |
| 665,762 | Germany | Oct. 3, 1938 |
| 208,622 | Switzerland | May 1, 1940 |